(12) United States Patent
Altieri et al.

(10) Patent No.: US 8,260,466 B2
(45) Date of Patent: Sep. 4, 2012

(54) MODULATED WATERING DEVICE BASED ON WATERING INDEX PERCENTAGE

(76) Inventors: Greig E. Altieri, Laguna Beach, CA (US); Matthew K. Davenport, Ladera Ranch, CA (US); Howard J. Jelinek, Laguna Beach, CA (US); Jae Y. Kim, Irvine, CA (US); Henry M. Ortiz, Aliso Viejo, CA (US)

( * ) Notice: Subject to any disclaimer, the term of this patent is extended or adjusted under 35 U.S.C. 154(b) by 284 days.

(21) Appl. No.: 12/787,174

(22) Filed: May 25, 2010

(65) Prior Publication Data

US 2010/0301133 A1    Dec. 2, 2010

Related U.S. Application Data

(60) Provisional application No. 61/217,000, filed on May 27, 2009.

(51) Int. Cl.
  *G06F 19/00* (2006.01)
  *F16K 31/48* (2006.01)
(52) U.S. Cl. ............. 700/284; 137/1; 137/59; 137/78.2; 137/78.3
(58) Field of Classification Search .................. 700/284; 137/1, 59, 78.2, 78.3
See application file for complete search history.

(56) References Cited

U.S. PATENT DOCUMENTS

| | | | |
|---|---|---|---|
| 3,140,720 A * | 7/1964 | Griswold | 137/59 |
| 4,165,532 A | 8/1979 | Kendall et al. | |
| 4,827,155 A | 5/1989 | Firebaugh | |
| 4,962,522 A | 10/1990 | Marian | |
| 5,097,861 A | 3/1992 | Hopkins et al. | |
| 5,193,570 A * | 3/1993 | Mott | 137/78.2 |
| 5,208,855 A | 5/1993 | Marian | |
| 5,479,339 A | 12/1995 | Miller | |
| 5,696,671 A | 12/1997 | Oliver | |
| 5,847,568 A * | 12/1998 | Stashkiw et al. | 324/696 |
| 5,853,122 A * | 12/1998 | Caprio | 236/44 C |
| 5,914,847 A | 6/1999 | Alexanian et al. | |
| 6,298,285 B1 | 10/2001 | Addink et al. | |
| 6,314,340 B1 | 11/2001 | Mecham et al. | |
| 6,351,366 B1 | 2/2002 | Alexanian et al. | |
| 7,363,113 B2 * | 4/2008 | Runge et al. | 700/284 |
| 7,836,910 B2 * | 11/2010 | Dresselhaus et al. | 137/78.3 |
| 2005/0167625 A1 * | 8/2005 | Deen | 251/129.04 |
| 2006/0144438 A1 * | 7/2006 | Dresselhaus et al. | 137/78.3 |
| 2007/0293990 A1 | 12/2007 | Alexanain | |
| 2009/0039173 A1 * | 2/2009 | Mammon | 239/11 |
| 2010/0300549 A1 * | 12/2010 | Altieri et al. | 137/1 |
| 2010/0301133 A1 * | 12/2010 | Altieri et al. | 239/99 |
| 2011/0036155 A1 * | 2/2011 | Dresselhaus et al. | 73/73 |

OTHER PUBLICATIONS

"Weather and Soil Moisture Based Landscape Irrigation Scheduling Devices", Technical Review Report—2nd Edition, Reclaimation: Managing water in the West, US Department of the Interior. Aug. 2007.*

* cited by examiner

*Primary Examiner* — Michael D Masinick
(74) *Attorney, Agent, or Firm* — Walter A. Hackler

(57) ABSTRACT

A device for controlling an irrigation system includes an interrupter for interconnection in a serial manner between a solenoid return common line and a preexisting irrigation timer, a controller for operating the interrupter in a periodic fashion is provided as well as an adjuster, in communication with the controller, for changing the periodicity of the interrupter operation.

11 Claims, 6 Drawing Sheets

MODULATED WATERING DEVICE BASED ON WATERING INDEX PERCENTAGE

The present invention claims priority from U.S. Provisional Patent Application Ser. No. 61/217,000 filed May 27, 2009. This application is to be incorporated herewith in its entirety by this specific reference thereto.

FIELD OF THE INVENTION

The present invention relates to the control of automatic irrigation systems, and more particularly to an auxiliary device which is added on to pre-existing automatic irrigation system controllers for the purpose of allowing system irrigation duration to be frequently and easily adjusted to a fraction or percentage of scheduled irrigation durations which have been pre-programmed into the irrigation system's pre-existing controller without having to alter pre-programmed irrigation schedules. The auxiliary device described allows for irrigation system owners or managers to simply and periodically adjust irrigation duration based on many factors including irrigation or watering indexes, the appearance of the irrigated landscape, local weather conditions, seasonal climate changes and changes in plant material demand where the automatic irrigation system resides. The controlling device described is capable of manual adjustment at the device itself, or manual adjustment via a separate wired or wireless adjustment dial, or automatic adjustment via an Internet gateway.

BACKGROUND OF THE INVENTION

Irrigation systems for domestic crops, residential landscapes, commercial landscapes, municipal landscapes and nurseries, etc. often utilize an electronic irrigation controller such as is disclosed in U.S. Pat. Nos. 4,165,532, and 4,827,155. Such electronic controllers are programmable, and are able to store a variety of irrigation programs. Programming of irrigation schedules is facilitated at the electronic controller by means of an alpha-numeric display and key pad or similar where information required for creating simple, temporal based irrigation schedules such as day of week, time of day, station number or valve number, run time or irrigation duration etc. may be input and reviewed. Such electronic controllers are typically wired to a plurality of electronic valves located throughout the irrigation system. During normal operation of the automatic irrigation system, the electronic irrigation controller proceeds by opening and closing the electronic irrigation valves as per the temporal parameters present in irrigation schedule(s) that have been programmed into the irrigation controller by the user. Typically, water under constant pressure is supplied by municipalities or water purveyors such that the opening of single or multiple electronic valves present in the irrigation system by the irrigation controller allows water to flow through particular zones or stations of the irrigation system such that water will be delivered on to the area to be irrigated until the closing of the electronic valves by the electronic controller as per the irrigation program.

Temporal based electronic irrigation system controllers have been available for decades and have had wide market acceptance because they have allowed homeowners, managers of commercial landscapes, and nurseries, etc. to irrigate landscapes and plant materials automatically and regularly on a temporally based schedule which has been input and stored in the electronic irrigation controller.

Over the years, however, an ever expanding population and increased urbanization has resulted in a proportional increase in residential and commercial landscaping square footage, which in turn has resulted in an increase in outdoor irrigation water consumption. Many regions throughout the U.S. now face water shortages and have therefore been forced to scrutinize high water use practices such as landscape irrigation, and to also examine opportunities for reducing water consumption, and in particular, to reduce water usage in high water consumption practices such as landscape irrigation.

In September of 2002, The United States Environmental Protection Agency published a report entitled "Water Efficient Landscaping" which stated that: "according to the US Geological Survey, of the 26 billion gallons of water consumed daily in the United States, approximately 7.8 billion gallons, or 30% is devoted to outdoor uses. The majority of this is used for landscape irrigation."

While the advent of electronic irrigation controllers has enabled irrigation of landscapes and plant materials to be performed automatically and on a regular schedule, these controllers have also been criticized for their lack of ability to automatically adjust irrigation schedules as a function of seasonal changes and local weather conditions such that irrigation is reduced and water is conserved when, for example, cooler or more humid weather, or even rain reduces landscape irrigation requirements. The essence of this criticism is that an electronic irrigation controller which has been programmed to deliver any volume of water above and beyond the minimum amount required for plant material sustainability may be considered to be wasteful of water resources.

In 1881, the State of California and cooperative agencies began using evaporation pan data to help estimate crop water use for purposes of water conservation. By recording the direct evaporation of water from a metal pan of known size, located in a prescribed environment, an estimation of crop water requirements would be made and thereby provide water planners and others with an effective tool for projecting water use for specific crops. This is an early example of weather based irrigation control. Since that time, many different formulas for estimating crop or landscape water usage have been put forth by the scientific community, each with varying levels of complexity and sophistication. Although there are many different such formulas in use today, the objective of each calculation method is essentially the same in that one to several physical and/or weather based factors such as, but not limited to extraterrestrial solar radiation, net solar radiation, mean ambient temperature, wind speed, and plant material water demand are used to estimate the amount of water lost at a particular location due to a combination of ground evaporation and natural plant material transpiration.

For a given area, water lost through ground evaporation and natural plant material transpiration has come to commonly be known as Evapo-Transpiration, or ET; and the variety of associated formulas for calculating ET have come to be known as ET calculations, ET formulas, or ET equations. ET calculations result in an integer value with units of inches or millimeters of water per unit time, such as inches or millimeters of water per day.

The introduction of so called Weather Based Irrigation Controllers (WBICs), or Smart Controllers, such as are disclosed in U.S. Pat. Nos. 4,962,522; 5,097,861; 5,208,855; 5,479,339; 5,696,671; 6,298,285 and 6,314,340 respond to the criticisms placed on simple temporal based irrigation controllers by utilizing various methods of estimating water losses due to ET, and then automatically adjusting irrigation programs such that subsequent irrigation cycles will replenish the lost water. Thus, many WBICs are often referred to as Evapo-Transpiration controllers, or ET controllers. The methods utilized by ET controllers for determining weather based watering schedules include the utilization of historical ET data for a given location, area or zone; and/or publicly available real-time ET data for a given location, area or zone; and/or the utilization of local auxiliary sensors and weather stations for obtaining local data required to calculate local ET values for a given location, area, or zone; and/or the utilization of latitudinal location such that ET values may be interpolated for a given location, area, or zone. The previously cited list of methods in which WBICs may obtain and/or generate and then utilize ET data is not meant to be comprehensive, but to demonstrate the wide variety of methods which are currently in use. Furthermore, it should be appreciated that while many different methods exist for obtaining, generating and utilizing ET data, WBIC controllers generally utilize the different methods with the same target objective which is to automatically and continuously alter programmed irrigation schedules based on weather conditions such that a theoretically adequate amount of water is delivered by the irrigation system to replenish water lost due to ET and thus satisfy landscape requirements without over watering.

Additionally, there is WBIC technology such as is disclosed in U.S. patent application Ser. No. 11/879,700 that distinguishes the utilization of certain weather based data, specifically extraterrestrial radiation, or RA, as separate from the set of weather data used in ET calculations. This WBIC technology requires that the WBIC's physical location be entered in to and stored by the WBIC so that an average summer high temperature for the WBIC's physical location may be obtained by the WBIC from a set of historical geo-environmental data for the entire U.S. which is stored by the WBIC's non-volatile memory. The zip code of the WBIC's physical location may be entered into the WBIC's user interface; or alternatively, the WBIC may be outfitted with a GPS system so that the WBIC can automatically obtain its physical location from global positioning satellites. This particular WBIC technology also requires that current local ambient temperature readings be obtained by an auxiliary external temperature sensor so that current ambient temperature readings at the WBIC's physical location may be taken together with stored historical high temperature data corresponding to the WBIC's physical location such that a standard temperature budget factor may be calculated and used to automatically alter irrigation programs accordingly. While this particular WBIC technology differs from ET controllers in that it does not attempt to replenish water lost do to evapo-transpiration, it is quite similar to ET controllers in its necessity to have its physical location entered in to the unit, its need to store historical geo-environmental data for the entire U.S. in look-up tables, its requirement to utilize local weather data obtained by an auxiliary temperature sensor, and in its requirement to perform mathematical calculations with externally obtained sensor data together with stored historical weather data in order to generate weather based irrigation programs. These similarities to ET controllers are cited to demonstrate this WBIC technology's comparable complexity and subsequent cost to that of ET controllers.

Unfortunately, and despite the many years that WBICs have been commercially available, WBICs have gained little market penetration despite aggressive rebate incentive programs offered to homeowners by municipalities and water purveyors whereby as much as 100% of the cost of WBICs is rebated to the homeowner, and/or the homeowner is required to trade in their existing temporal based irrigation controllers for new WBICs. There are a number of factors which may account for the low market penetration of WBICs including WBIC price, complexity and performance.

Due to the amount of weather data that must be obtained and/or generated by WBICs, they are by nature complex pieces of equipment. As previously stated, many WBICs require the use of auxiliary sensor input from various types of weather sensors or weather stations so that mathematical calculations may be performed by the WBIC resulting in the generation of weather based irrigation programs. If no additional installation cost is to be incurred, the homeowner must not only attach the WBIC to his or her existing irrigation system, but may also have to select a location on his or her property for weather sensor or weather station installation which will be representative of the weather conditions experienced by the entire landscape. For those homeowners not skilled in the installation of weather sensors or weather stations, this requirement can be quite challenging and prone to errors resulting in improper operation of the WBIC.

After WBIC installation is complete, the initial set up and programming of WBICs requires the input of WBIC physical location as well as many variables that are characteristic of the landscape environment present at each different watering zone or station to be irrigated by each separate electronic irrigation system valve controlled by the WBIC such as soil type, physical slope gradient, percent sun exposure, root zone working storage depth, identification of landscape plant material types, crop or landscape coefficient, water delivery method (spray, bubbler, drip, rotator, etc.), and irrigation system precipitation rate. If the homeowner determines that the installation and initial set up of the WBIC is beyond his or her landscaping and horticulture expertise and thus too complex, installation and initial set up of the WBIC will require the hiring of an irrigation or landscape professional which results in additional cost to the homeowner.

Another factor which may help account for the low market penetration rate of WBICs is the documented low water savings obtained through the use of WBICs. A report entitled "Evaluation of Weather Based "Smart" Irrigation Controller Programs" which was prepared for the California Department of Water Resources by The Metropolitan Water District of Southern California and The East Bay Municipal Utility District on Jul. 1, 2009 presented the results of the impact of 3,112 WBICs installed at 2,294 sites within the State of California. These sites met the fundamental data requirements established for inclusion in this study, i.e. one full year of pre- and post-installation water usage billing data, corresponding climate data, a measurement of the landscape area at the site, and basic information about the site, controller, and installation. This report states that "Overall, outdoor water use was reduced by an average of 47.3 kgal per site (6.1% of average outdoor use) across the 2,294 sites examined in this study as part of the California Weather-Based Irrigation Controller Programs. This reduction was found to be statistically significant at the 95% confidence level." The characteristic high cost and complexity of WBICs, coupled with the ability to deliver only 6.1% average water savings, may mean that the typical homeowner is unlikely to be motivated to discard their existing, perfectly good irrigation controller and replace it with a WBIC. Perhaps more importantly, at only 6.1% average water savings, the overall water conservation performance provided by WBICs does not provide municipalities and water purveyors with the amount of water savings they require.

Another interesting finding cited in the "Evaluation of Weather Based "Smart" Irrigation Controller Programs" report states that "While the overall impact of smart controllers is expected to reduce irrigation demands, irrigators who historically apply less than the theoretical irrigation requirement for their landscape, can expect their water use to increase after installing a smart controller. On the individual site level, a total of 56.7% of the 2,294 study sites had a statistically significant reduction in weather-normalized application ratio, while 41.8% of sites had a statistically significant increase in application ratio. For 1.5% of sites, there was not a statistically significant change in application ratio."

Surprisingly, 41.8% of these 2,294 WBIC study sites experienced an increase in water usage. WBIC manufacturers have stated that the true performance of WBIC technology should be evaluated based on the WBIC's ability to deliver adequate landscape irrigation as determined by prevailing weather conditions, and not as to whether or not the WBIC irrigates more or less than the pre-WBIC irrigation controller. Were these 41.8% of study participants practicing deficit irrigation techniques, or purposely, or unknowingly stressing their landscape plant materials prior to installation of the WBIC; or is it that, as compared to humans, even state of the art WBIC technology lacks the capability to more precisely and cost effectively address the myriad of factors and requirements for determining adequate yet conservative landscape irrigation. While not directly addressed in the report, one reasonable conclusion would be that a significant number of irrigators (homeowners) in the general population may be better able to determine conservative yet adequate irrigation programs than today's state of the art WBIC technology. Yet another reasonable conclusion would be that state of the art irrigation controller technology is misguided in its attempt to completely eliminate human participation in determining conservative yet adequate landscape irrigation practices. This conclusion is supported by a recent article published in "Lawn and Landscape" magazine in November, 2009 which, in response to a recent Texas A&M WBIC study whose results concluded that WBICs used more water than required by the university's test landscapes, states that "Many of the studies undertaken so far on smart controllers have shown that without proper programming and follow up to adjust the program, the controller will not save much—if any—water. These same studies show that when the follow-up adjustments are performed, the controllers reduce water use considerably." Thus it can be seen that despite the continued effort to eliminate the human from the landscape irrigation process, it appears that even state of the art irrigation controller technology continues to require human intervention in order to reap the expected benefits.

While it may be possible to improve upon existing WBICs by adding still more technology and sophistication in efforts to completely eliminate human participation in the landscape irrigation process, autonomously and automatically generate adequate irrigation programs, and produce the water savings expected by municipalities and water purveyors, these advancements will most likely be accompanied by an increase in cost and complexity. What follows is a discussion of alternatives.

As previously mentioned, a common criticism of simple temporal based irrigation controllers is their lack of ability to automatically adjust irrigation programs as a function of seasonal change and to match local weather conditions. The Metropolitan Water District of Southern California's website posts data (FIG. 1) demonstrating the amount of water which could be conserved if electronic irrigation controllers were adjusted to match local weather conditions "instead of just twice a year, which is typical for many people." The amount that may be saved is estimated to be as much as 40%.

In recent years and in an effort to simplify the articulation, communication and implementation of weather based irrigation practices for the general population, an irrigation or watering factor, sometimes called a watering index, has been adopted by many water purveyors throughout the U.S. One far reaching advantage of a watering index approach to outdoor water conservation is its ability to be implemented using the large installed base of existing electronic irrigation controllers, independent of irrigation controller type or technology. Thus, a watering index approach may be applied more broadly, more rapidly, more cost effectively, and with less effort than mass or even gradual implementation of new WBIC technology.

The watering index principle was developed by Mr. John Wynn of the State of California Department of Water Resources, and while there are variations on how a watering index may be calculated, it is generally taken to be a ratio of current local ET to the ten year historical ET high for a given location. In another variation, historical weekly and monthly averages may also be used to calculate weekly and monthly watering index estimates and forecasts (FIG. 2). A noteworthy tenet of the watering index principle is that a watering index value is not expressed in terms of inches or millimeters of water per unit time, in fact, a watering index has no units at all, it is simply a percentage. This is because the watering index principle assumes that the grower, professional landscaper or homeowner, through experience and interaction, is already aware of the many factors present in his or her area to be irrigated which determine adequate irrigation and is therefore able to program their irrigation controller with adequate yet conservative watering durations for each zone having already taken the many influential factors into account. A watering index is intended to aid growers, landscapers and homeowners in adjusting watering schedules to better match the variable factors of local weather conditions and seasonal change as a percentage or fraction of their self determined maximum adequate yet conservative watering requirements during the hottest, driest time of year. For example, in the Northern hemisphere, a watering index is typically at or near 100% during July and August, and is only a fraction of this during the remaining months of the year.

Retail water agencies that have adopted a watering index as a method for outdoor water conservation will typically publish weekly or monthly watering index values on their websites. Once obtained from the local water district, irrigation programs for irrigation systems utilizing a watering index approach and served by the local water district may be safely adjusted to the prescribed watering index value. It should again be pointed out that a watering index does not specify the durations of irrigation schedules, or volumes of water that should be replenished. Instead, a watering index simply specifies a value which is a fraction or percentage of the reference 100%, as self determined by the irrigator, which occurs during the warmest, driest time of year.

FIG. 1 shows a typical ET curve and the step-curve created from watering index values. Similar to ET, watering indexes are highest during the warmest periods of the year, and lowest during the coolest periods of the year. The third curve (also a step curve) shows the water used when the irrigation program is adjusted just twice a year—a typical irrigation control method for many homeowners and landscapers. The blue area present between the step curves represents the amount of water, which is conserved when irrigation schedules are based on weekly watering index values as opposed to a typical bi-annual adjustment.

FIG. 2 shows a calendar with a water purveyor's recommended monthly watering index values which have been forecast for the entire year.

Non-WBIC electronic irrigation controllers equipped with a built in watering index percentage adjustment feature which allow irrigators to perform a global adjustment of their irrigation programs by turning a dial to the desired watering index percentage value have been commercially available for several years. This feature allows global adjustment of the irrigation program for each irrigation system zone simultaneously. A fault remains, however, in that because the aforementioned watering index percentage adjust feature is integrated into the controller, in most circumstances this feature along with the controller will be installed outdoors in locations not frequently seen or visited by the irrigator. Because electronic irrigation controllers, including those with watering index percentage adjust features, are typically and intentionally installed outdoors, out of plain sight and out of mind, even these controllers, in many cases, are not adjusted as frequently as intended due to inconvenience. Furthermore and despite the many advantages of watering index implementation, an additional practical problem exists for water purveyors seeking aggregate water savings in that the vast majority of homeowners and landscapers have older irrigation controllers which do not have an integrated watering index adjustment feature. While these homeowners and landscapers may wish to respect and implement a watering index principle as put forth by their local water district, they may find it too challenging and/or inconvenient to frequently calculate new watering index based irrigation programs each day, week or month, and then re-program their irrigation controllers to correspond with the desired watering index value. In fact, many older irrigation controllers can only be adjusted in 5-minute increments making it impossible to adjust irrigation programs based on a watering index value. The result is that the vast majority of homeowners and landscapers, regardless of electronic controller make, model, or vintage, are likely to default to the bi-annual controller adjustment method depicted in FIG. 1 which, in aggregate, represents a significant amount of wasted water for retail water agencies.

Thus it can be seen that typical irrigation controllers, WBIC or non-WBIC, are at best, inconvenient to adjust, and at worst, too challenging to adjust; that this inconvenience and/or difficulty leads to an unacceptable infrequency of controller adjustment; and that infrequency of controller adjustment results in over watering and therefore wasted water resources.

In summary, it follows then that an improved approach to conserving water during landscape irrigation practice would be to build upon the many municipal and university studies which have observed several thousands of WBICs in varying regions of the U.S. and demonstrate, directly or indirectly, that the inclusion of human participation in the landscape irrigation process is either required or is at least beneficial in reducing the amount of water that is unnecessarily wasted in landscape irrigation. Rather than the elimination of human participation in landscape irrigation through complex and expensive technology, a simpler, less costly and more effective approach would be to embrace and further engage human participation in the landscape irrigation process. Additionally, it follows that, due to its ability to be immediately implemented across the large installed base of existing irrigation controllers independent of controller type or technology, a watering index based approach is advantageous because it will more rapidly, more cost effectively and with minimum effort result in broad based aggregate water savings for water purveyors. Furthermore, it follows that by addressing the practical issues of convenience and ease with which a watering index based approach may be implemented, achieving the broad based aggregate water savings desired by municipalities and water purveyors may be enabled.

A simpler and more cost effective improvement over WBICs which addresses the large installed base of existing electronic irrigation controllers as well as future generations of new, low cost temporal based irrigation controllers for the purpose of reducing waste and conserving water used in landscape irrigation is addressed in this disclosure.

SUMMARY OF THE INVENTION

A device in accordance with the present invention for controlling an irrigation system in conjunction with a preexisting irrigation timer powering a solenoid valve generally includes an interrupter for interconnection in a series-like manner between a solenoid return common line and the timer.

A controller is provided for operating the interrupter in a periodic fashion and an adjuster, in communication with the controller, is provided for changing the periodicity of the interrupter operation.

In one embodiment of the present invention, a remote control is provided for establishing the communication between the adjuster and controller and in yet another embodiment in accordance with the present invention the remote control is configured for communication via the Internet.

In an alternative embodiment of the present invention, a current sensor is provided for sensing when a preexisting timer is active such that pre-programmed irrigation schedules may be learned.

A method in accordance with the present invention for controlling an irrigation system includes setting an irrigation timer to power a solenoid valve for a selected water duration and thereafter periodically interrupting power to the solenoid valve during the selected water duration. The method may further include selecting periodicity of the power interruption before periodically interrupting the power and the selection may be made in accordance to a Watering Index.

More particularly, a method in accordance with the present invention for modifying control of an irrigation system having irrigation timer for powering a solenoid valve for a selected water duration generally includes connecting a device in series with a solenoid valve return common wire and the timer and operating the device to periodically interrupt continuity in the common wire during the selected water duration.

A method in accordance with the present invention for controlling an irrigation system includes setting an irrigation timer to power a solenoid valve for a selected water duration and sensing when and for how long a solenoid valve is activated and thereafter interrupting power to the solenoid valve during the selected water duration in accordance to a Watering Index.

More particularly, a method in accordance with the present invention for modifying control of an irrigation system having irrigation timer for powering a solenoid valve for a selected water duration generally includes connecting a device in series with a solenoid valve return common wire and the timer, sensing when and for how long a solenoid valve is activated, and operating the device to periodically interrupt continuity in the common wire during the selected water duration.

BRIEF DESCRIPTION OF THE DRAWINGS

The advantages and features of the present invention will be better understood by the following description when considered in conjunction with the accompanying drawings in which.

DETAILED DESCRIPTION

Figure 1:
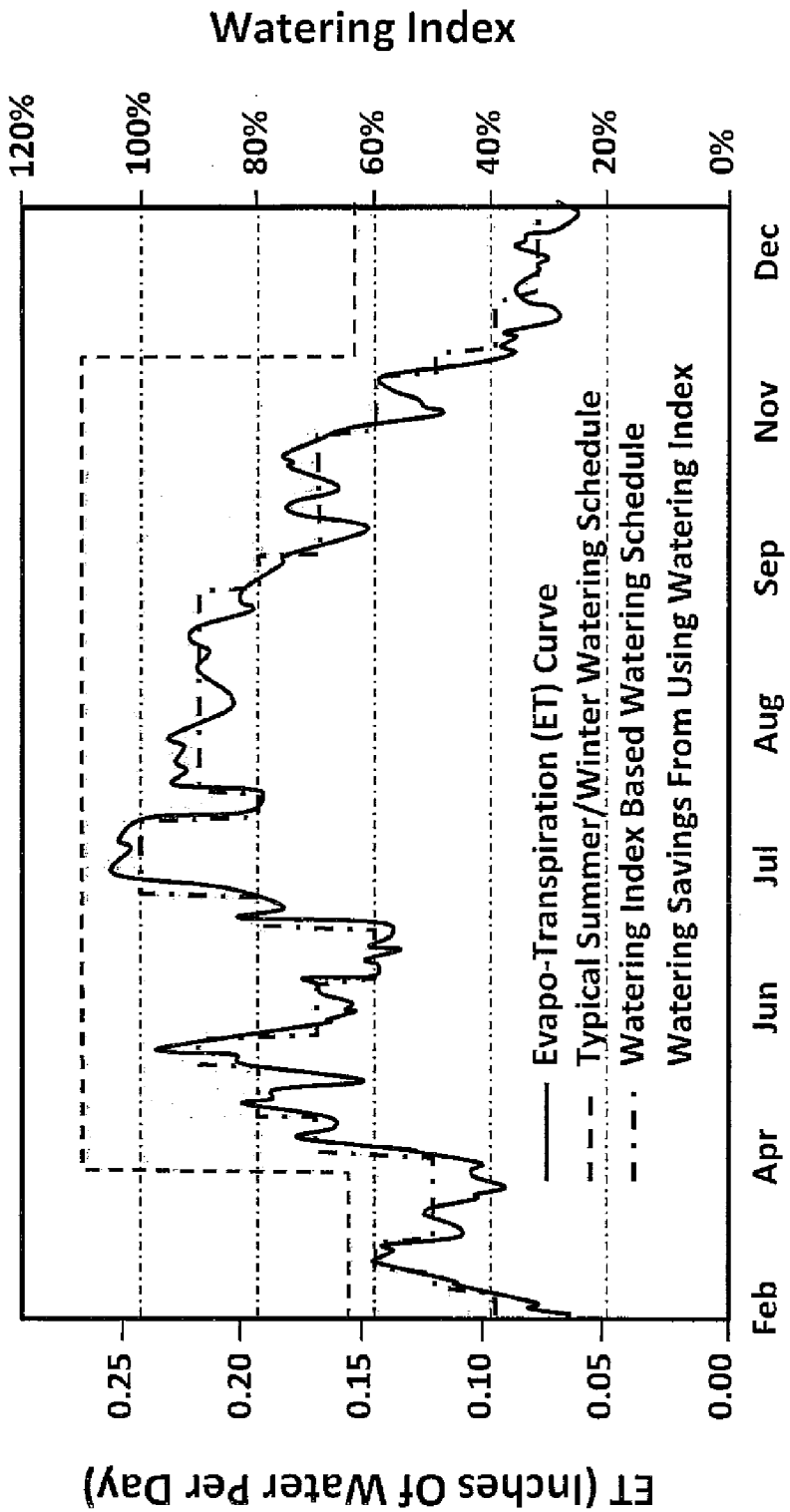
FIG. 1 is a historical watering index value example plot demonstrating annual potential water savings.
Figure 2:
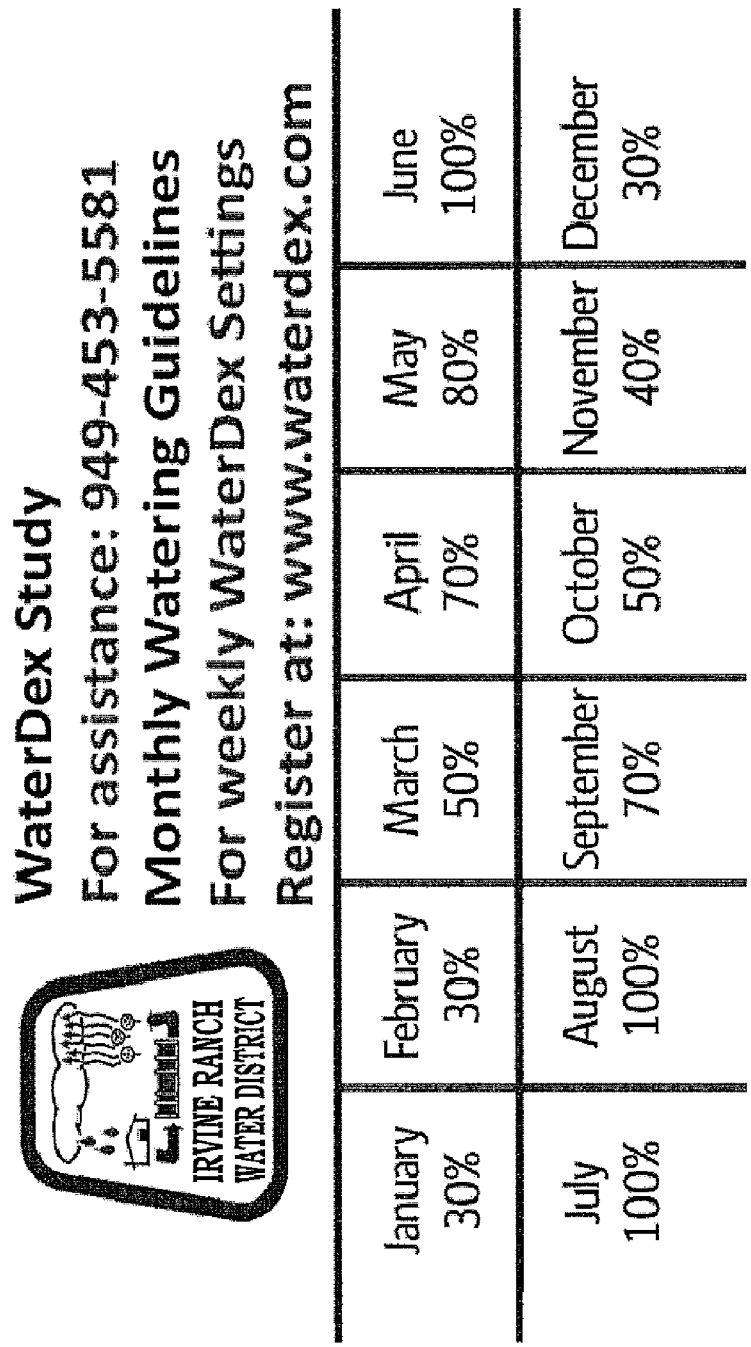
FIG. 2 is a watering index value example in an annual forecast format.
Figure 3:
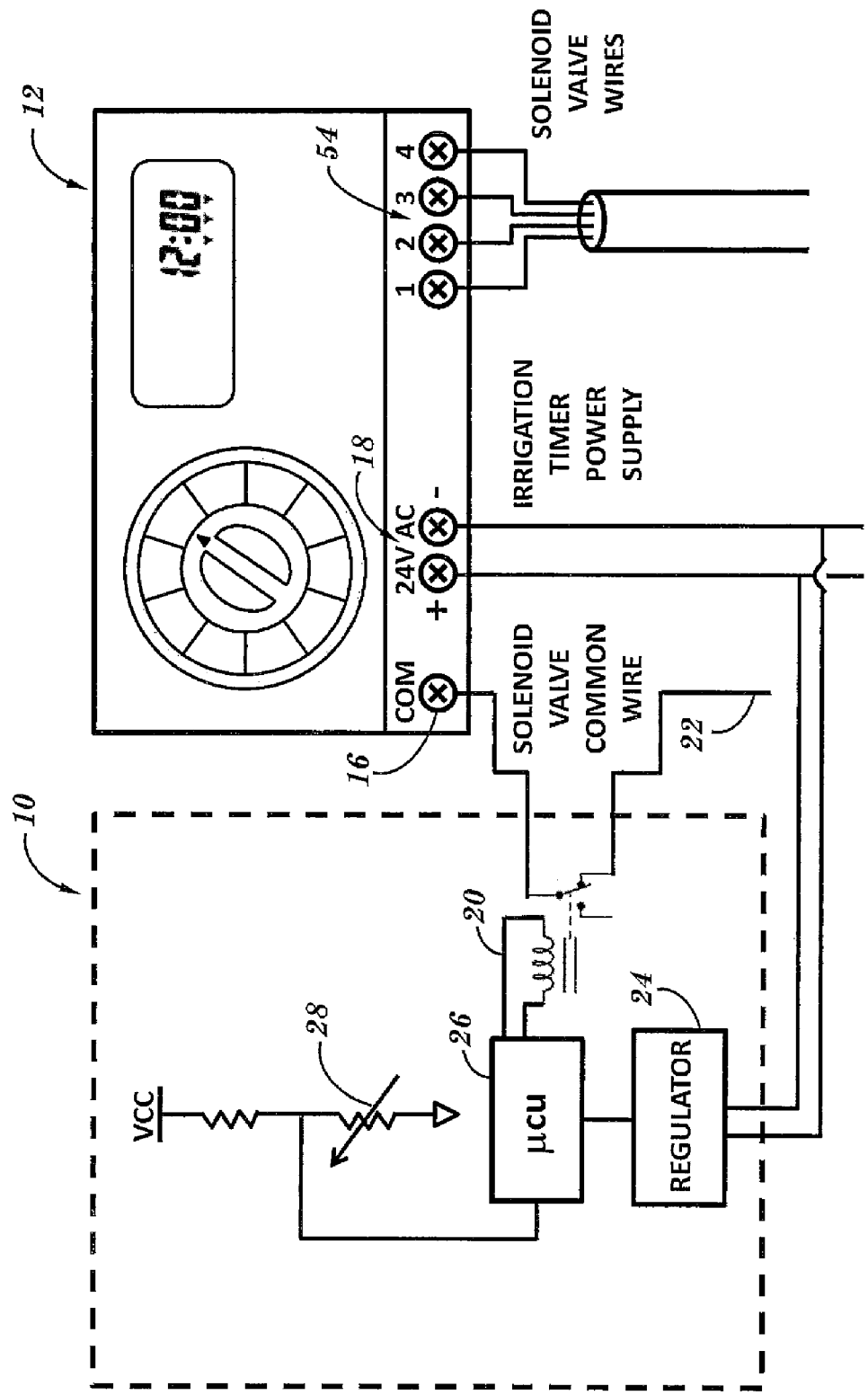
FIG. 3 is a block diagram of the device in accordance with the present invention as it may be interconnected with a preexisting irrigation timer.

With reference to FIG. 3, there is shown a Modulated Watering Device 10 in accordance with the present invention for controlling an irrigation system (not shown) in conjunction with a preexisting irrigation timer 12 having a common terminal 16 along with a low voltage power input/output 18.

The device includes an interrupter 20 interconnected in a serial manner between a solenoid return common line 22, and the timer 12, common terminal 16, a regulator 24 is provided for interconnection with the timer low voltage power input/output 18 for powering a controller 26 for operating the interrupter 20 in a periodic fashion. The interrupter 20 may be, for example, an on/off relay switch. It should be appreciated that the functional blocks shown in the figures in the present application include conventional electronics.

An adjustment dial, button, or rocker switch, etc. 28 is in communication with the controller 26 for changing the periodicity of the relay switch 20 operation.

Figure 4:
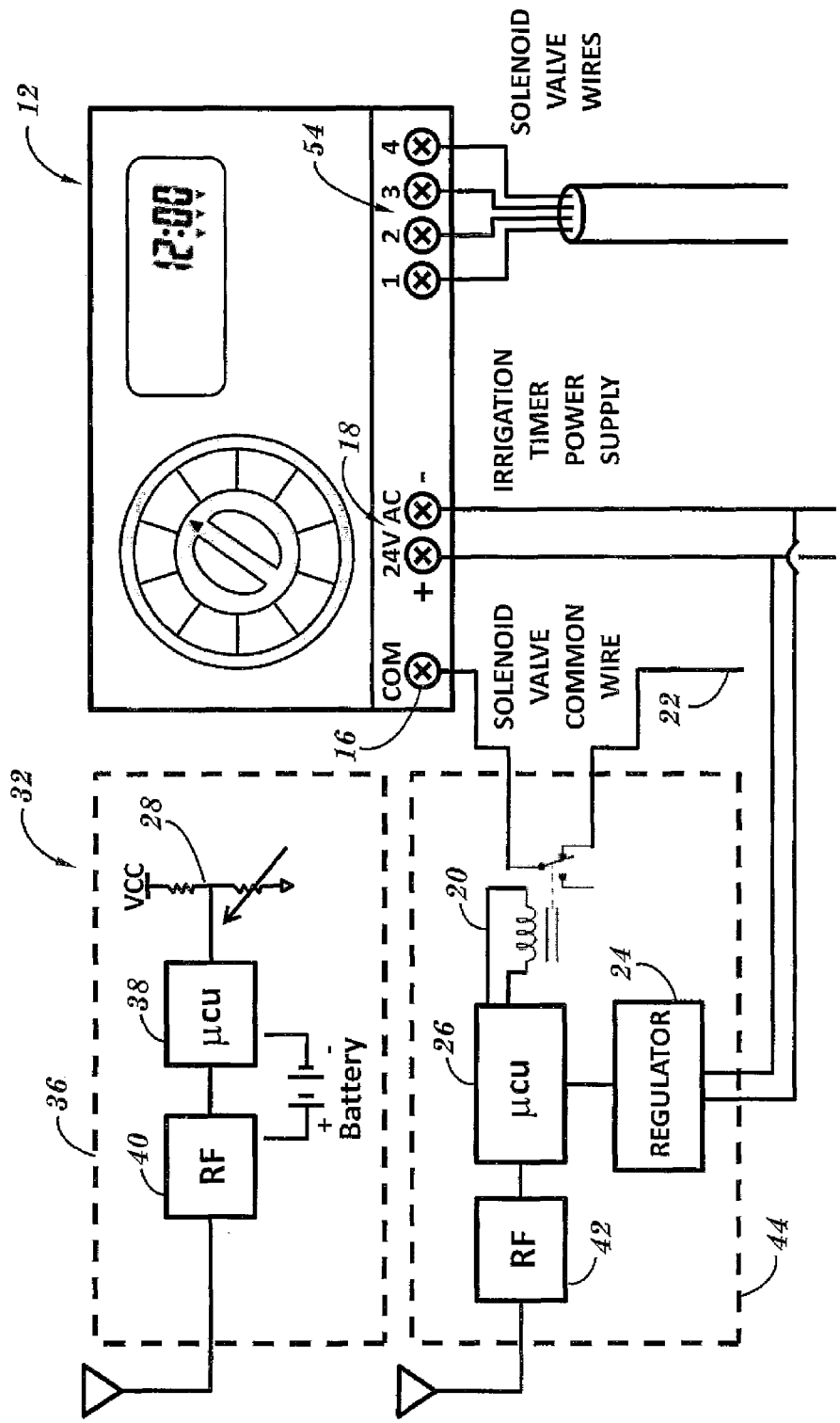
FIG. 4 is a block diagram of an alternative embodiment of the present invention utilizing a remote control.
Figure 5:
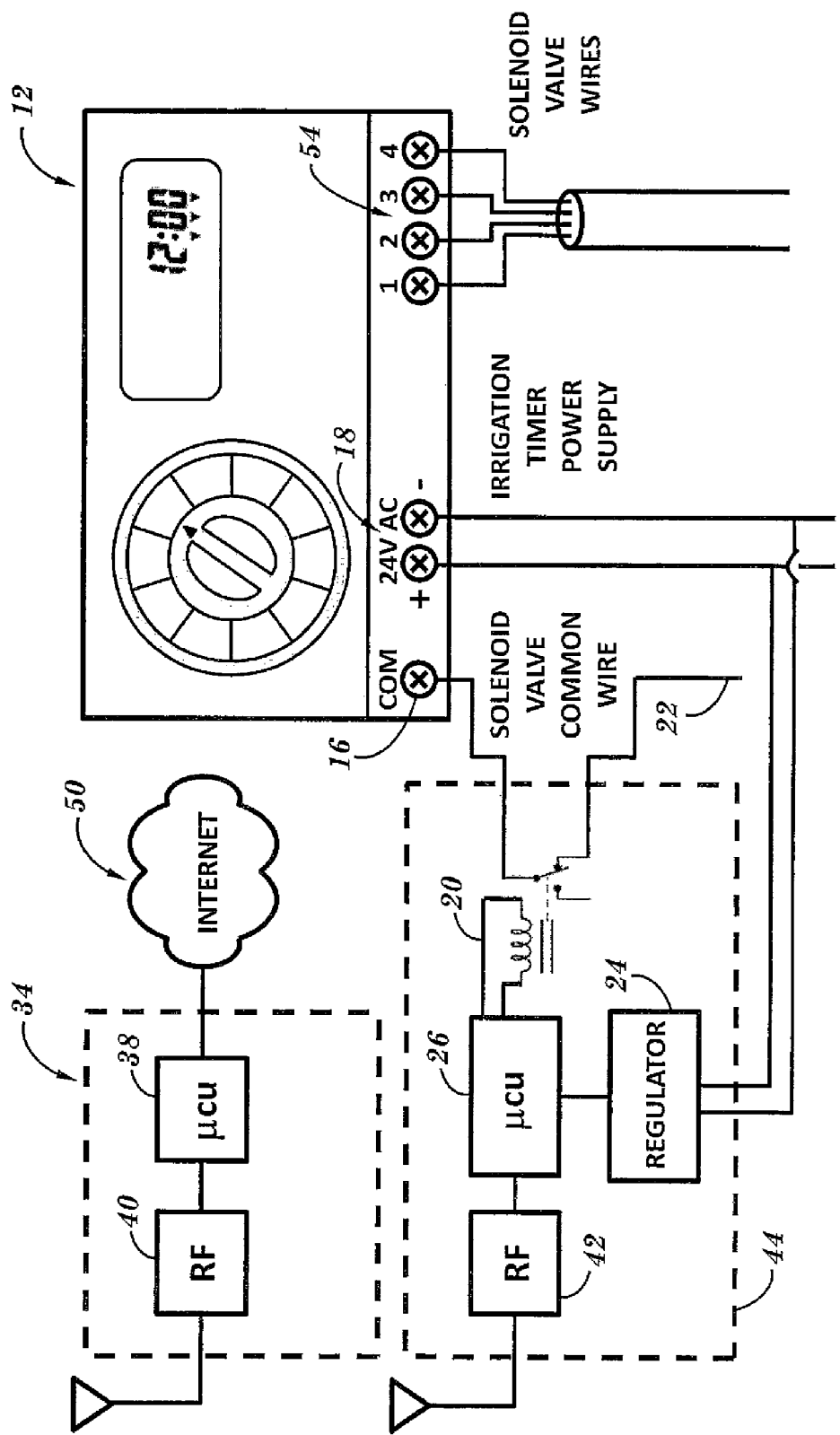
FIG. 5 is yet another embodiment of the present invention illustrating interconnection with the Internet.

Alternative embodiments 32, 34 of the present invention are illustrated in FIGS. 4 and 5 respectively with identical or substantially similar components identified by common character references.

The embodiment 32 as shown in FIG. 4, utilizes a remote adjustment module 36 and a controller 38 for communicating via an RF transmitter 40 to a receiver 42 disposed in a base unit 44. All electronics associated with this embodiment are conventional in nature.

The embodiment 34 illustrated in FIG. 5 utilizes interconnection with the Internet 50 in a conventional manner.

Figure 6:
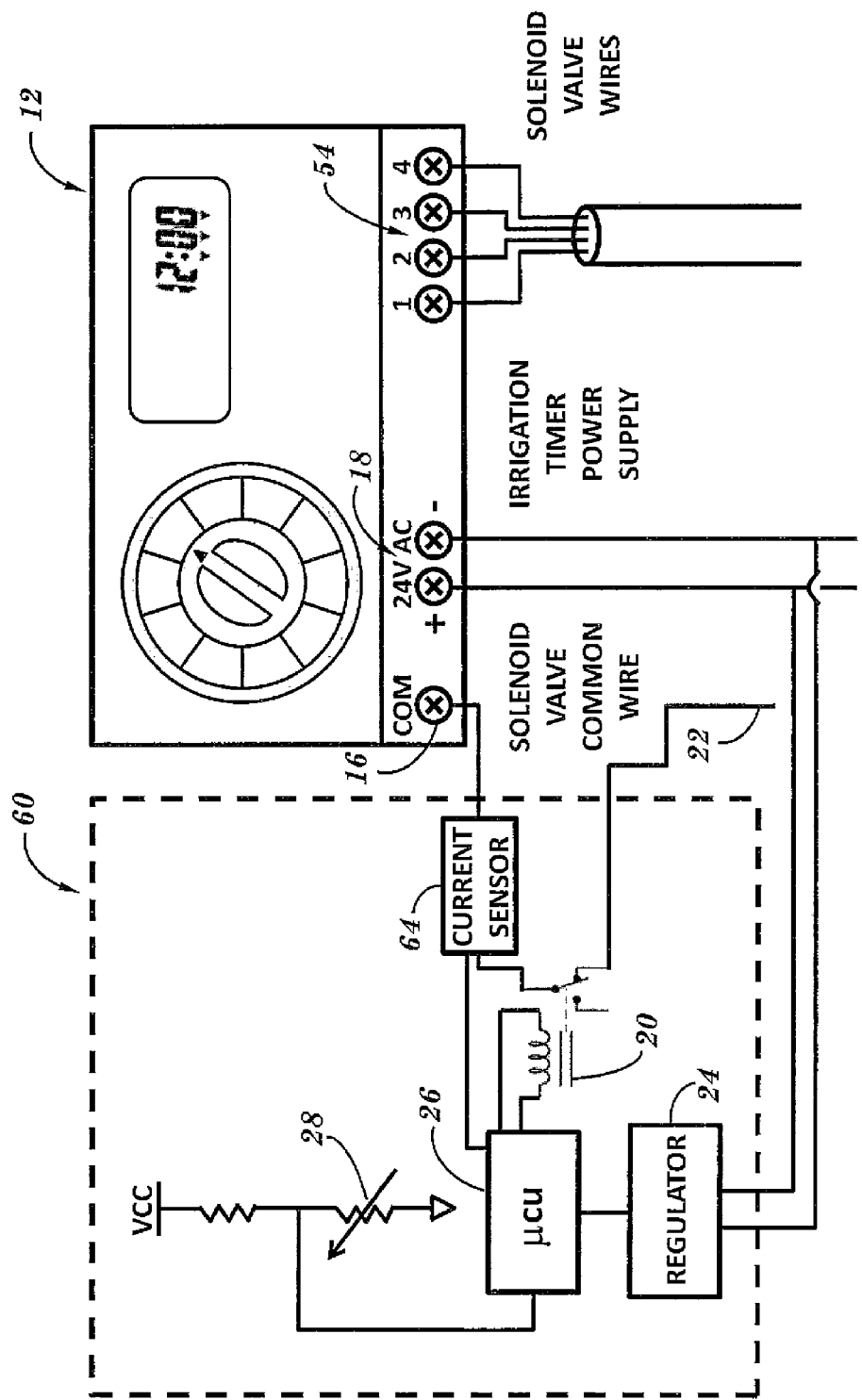
FIG. 6 is yet another embodiment of the device including utilization of a current sensor as it may be interconnected with a preexisting timer.

The alternative embodiment of a device 60 in accordance with the present invention illustrated in FIG. 6 utilizes a current sensor 64 for sensing when and for how long a solenoid valve common wire is activated and communicates this information to the base unit micro processor 26 such that programmed watering schedules may be learned by the device 60. Common reference characters in FIG. 6 refer to identical or substantially identical component shown in FIG. 3.

An adjustment dial, button, or rocker switch, etc. 28 is in communication with the controller 26 for changing the periodicity of the interrupter 20 operation based upon a watering index and in relation to the learned, pre-programmed water duration.

A method for controlling an irrigation system utilizing the Modulated Watering Device 10, which may include setting an irrigation timer to power a solenoid valve for selected water duration and thereafter periodically interrupting power to the solenoid valve during the selected water duration. More particularly, the method includes selecting the periodicity of power interruption before periodically interrupting the power and such selection is preferably based upon a Watering Index, hereinabove described. More specifically, the method in accordance with the present invention includes connecting the modulated water device in series with a solenoid valve return common wire and the timer in operating the device to periodically interrupt continuity in the common wire during the selected water duration.

In summary, the invention described in this application is a simple to use, low cost Modulated Watering Device (10) which may be retrofitted to most existing irrigation timers. Once installed, the adjustment dial, button, or rocker switch, etc. 28 on the device 10 may be used to adjust each hydro-zone's irrigation schedule to an infinitely variable fraction of the programmed duration.

The controller 26 pre-programmed to open and close the interrupter 20, or relay switch at a regular OPEN-CLOSE duty cycle (D). The adjustment dial 28 may be adjusted to any percentage value less than or equal to 100%, typically the local Watering Index (WI) value. The value to which the adjustment dial 28 is set effects the relay duty cycle as requested by the equation:

$$\sum_{i=1}^{P/D}(WI*D)_i = WI*P$$

Where:
Relay Duty Cycle=D
Adjustment Dial Setting (%)=WI
Relay Closed Time=WI*D
Relay Open Time=D−(WI*D)

The relay 20 is connected in series with the solenoid valve return common wires 22 present at the irrigation timer 12. When the existing irrigation timer 12 automatically cycles through each hydro-zone's irrigation program successively activating each hydro-zone's solenoid valve circuit, the relay switch 20 will periodically interrupt and deactivate the solenoid valve circuit according to the percentage value to which the adjustment dial 28 has been set and the equation above. The result is that regardless of the amount of time that an existing irrigation timer 12 is programmed to activate any solenoid valve circuit 52, the total amount of time that any solenoid valve circuit is actually activated over the duration of the program (P) is equal to WI*P.

As shown, the device 10 may be powered parasitically by attaching the device power and ground wires to the timer low voltage power input/output 18 present at the existing irrigation tinier 12.

Although there has been hereinabove described a specific modulated watering device and method in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element, which is not specifically disclosed herein. Accordingly, any and all modifications, variations or equivalent arrangements, which may occur to those skilled in the art, should be considered to be within the scope of the present invention as defined in the appended claims.

What is claimed is:

1. A device for controlling an irrigation system in conjunction with a preexisting irrigation timer powering a solenoid valve, said device comprising: an interrupter for interconnection in a serial manner between a solenoid return common line and the timer; a controller for operating the interrupter in a periodic fashion directly proportional to a percentage retrieved by referencing a Watering Index; and an adjuster, in communication with said controller, for changing the periodicity of the interrupter operation.

2. The device according to claim 1 further comprising a remote control for establishing communication between said adjuster and said controller.

3. The device according to claim 2 wherein said remote control is configured for communication via the Internet.

4. The device according to claim 1 wherein said controller is configured to open and close the interrupter at a regular ON-OFF duty cycle (D).

5. The device according to claim 4 wherein said adjuster causes the controller to change the ON portion of the duty cycle from between 0% and 100% of the duty cycle.

6. The device according to claim 1 further comprising a regulator for powering the device by way of power from the timer.

7. The device according to claim 1 further comprising a current sensor in communication with said controller for determining a duration of each pre-programmed timer cycle and the controller is configured for learning the pre-programmed duration and changing the periodicity of the interrupter based on the learned pre-programmed duration.

8. A method for controlling an irrigation system, the method comprising: setting an irrigation timer to power a solenoid valve for a selected water duration; selecting a periodicity of power interruption directly proportional to a percentage retrieved by referring to a Watering Index; and periodically interrupting power to the solenoid valve during the selected water duration via an interrupter interconnected in a serial manner between a solenoid return line and the irrigation timer.

9. A method for modifying control of an irrigation system having an irrigation timer for powering a solenoid valve for a selected water duration, the method comprising: connecting a device in series with a solenoid valve return common wire and the timer; and operating the device to periodically interrupt continuity in the common wire during the selected water duration; where the periodicity is preselected to be directly proportional to a percentage retrieved by referring to a Watering Index.

10. The method according to claim 9 further comprising operating the device remotely.

11. The method according to claim 9 further comprising powering the device by attaching device power and ground wires to power and ground connections of the timer.

* * * * *